United States Patent [19]

Ruland

[11] Patent Number: 5,096,327
[45] Date of Patent: Mar. 17, 1992

[54] CLAMP COLLAR ASSEMBLY
[75] Inventor: Fred F. Ruland, Weston, Mass.
[73] Assignee: Ruland Manufacturing Company, Inc., Watertown, Mass.
[21] Appl. No.: 674,610
[22] Filed: Mar. 25, 1991
[51] Int. Cl.$^5$ .............................................. B25G 3/24
[52] U.S. Cl. ................................... 403/290; 403/344; 403/362; 24/279
[58] Field of Search ............... 403/344, 290, 289, 343, 403/373; 24/279

[56] References Cited
U.S. PATENT DOCUMENTS

| | | | |
|---|---|---|---|
| 995,478 | 6/1911 | Nelson | 403/344 X |
| 2,238,937 | 4/1941 | Hufferd et al. | 403/343 |
| 3,109,663 | 11/1963 | Phillips, Jr. | 403/344 X |
| 3,473,202 | 10/1969 | Howard | 403/344 X |
| 3,846,742 | 11/1974 | Ettinger | 403/290 X |
| 3,876,318 | 4/1975 | Crispell | 403/290 |
| 4,116,572 | 9/1978 | Heldmann et al. | 403/344 X |
| 4,217,061 | 8/1980 | Eiland et al. | 403/344 X |
| 4,428,697 | 1/1984 | Ruland | 403/344 |
| 4,969,374 | 11/1990 | Borromeo | 403/344 X |

Primary Examiner—Randolph A. Reese
Assistant Examiner—Heather Chun
Attorney, Agent, or Firm—Lahive & Cockfield

[57] ABSTRACT

A C-shaped clamp collar is adapted for attachment to a shaft having radius R. The collar includes a screw for controlling the relative distance between the opposed ends of the collar. The collar has a nominal (rest) inner diameter less than 2R. The screw and collar adapted so that the screw may sequentially drive the opposed ends of the collar apart so that its inner diameter is greater than 2R and the collar may be placed on the shaft, and then draw those ends together until the inner diameter is equal to R and the collar is forced against the shaft.

5 Claims, 6 Drawing Sheets

CLAMP COLLAR ASSEMBLY

BACKGROUND OF THE INVENTION

This invention relates to accessories for machine tools, and more particularly to clamp collars and shaft couplings.

It is well known in the art to provide clamp collars, shaft couplings and the like (hereinafter generally referred to as collars or clamp collars) which may be removably mounted on a rotating shaft, for example, of a rotating machine. Typical clamp collars are generally C-shaped and include a flexure portion between the end portions thereof. A screw coupling for the two end portions is adapted for drawing the end portions towards each other and securing the collar at its inner surface to the shaft.

The conventional clamp collars, however, are typically selected for use on a shaft of a radius R, where the collar has a slightly larger "radius" $r_1$. After the collar is slid onto the shaft, the screw which couples the two end portions of the collar is tightened to draw the collar about the shaft. The tightened collar is thereby deformed slightly in order to clamp the collar to the shaft. The amount of clamping is dependent upon the force applied by the screw. The screw is first torqued in order to draw the clamp to the shaft, and then is torqued in order to tighten the drawn-to collar tight around the shaft in a clamping fashion. Thus, only the secondary torquing is used to clamp the collar to the shaft. The energy to establish the initial torquing, by which the collar is drawn to the shaft, has little or no effect on the clamping capability of the collar, and thus represents an unnecessary expenditure of energy.

It is therefore an object of the present invention to provide a new and improved clamp collar.

SUMMARY OF THE INVENTION

The present invention relates to a device for clamping onto a rotatable shaft having a radius R. The device is generally referred to as a clamp collar, and may include in various embodiments a shaft coupling, clamp collar, or the like.

The clamp collar assembly includes a C-shaped collar made of a resilient material, such as steel. The collar extends between a first end and an opposed second end, where the first and second ends define a circumferentially extending gap having a dimension G in the circumferential direction. The collar includes a bore, or hole, extending through the first and second ends.

The portion of the bore in the first end is threaded with a first helical thread pattern having a pitch P, and has a predetermined minor diameter MD1. The portion of the bore in the second end is threaded with a second helical thread pattern. The second pattern is substantially the same as the first pattern with a pitch P, but has a minor diameter MD2 which is less than or equal to MD1.

The collar has a circular inner surface with a radius R when it is circumferentially deformed such that G has a predetermined value G1. When in its undeformed (rest) state, the collar has a nearly circular inner surface with a nominal radius less than R, and where the gap $G_1$ equals $G_0$, where $G_0$ is less than $G_1$.

When the collar is expansively deformed such that $G = G_2$ where $G_2$ is greater than $G_1$, the bore through the first and second ends extends along a common reference axis with the thread pattern of the respective portions of the holes being substantially aligned (or "in-phase") to be part of a common helical thread pattern. When the collar has its gap G less than $G_2$, the thread pattern of the portions of the bore in the two ends are "out-of-phase", i.e., they are axially offset by a fraction of the pitch P, and thus are not aligned along a common helical thread pattern.

A screw is adapted for insertion into the bore. The screw includes a shaft with a head on a proximal end and includes a distal end opposite the proximal end. At the distal end, the screw has a helically threaded region characterized by a pitch P and pitch diameter substantially adapted for interfitting the bores of the first and second ends, and having a major diameter greater than MD2. At its proximal end, the screw includes a shank segment having an outer diameter less than MD1, where the segment extends along the shaft at least a distance d, where d is at least equal to the length of the threaded hole in the first end of the collar.

In the preferred form, the second thread pattern is a full thread and the first thread pattern is less than a full thread, such as a half thread.

In use, the clamp is initially in its nominal and unstressed (rest) condition where the gap equals $G_0$. It is first driven into an expanded and deformed condition so that the gap equals $G_2$ (where $G_2$ is greater than $G_1$) by advancing the screw into the bore. The screw initially is threaded into the threaded receiver of the first end portion, but as a result of the axial misalignment of threaded receivers of the two portions of the bore, the tip of the screw contacts an abutment surface on the surface of the bore at the second end portion. As the screw is now advanced through the receiver of the first end portion, abutment of the screw tip forces flexing of the collar such that the end portions are urged away from each other; this causes the gap between them to expand from a nominal gap dimension $G_0$ to an expanded dimension $G_2$, where the threaded receivers in the end portions are generally aligned with a common helical thread pattern of pitch P. As a result of this expansion and resulting axial separation of the portions of the bore in the two end portions, the interior circumference of the collar is forced out of round to a nominal diameter greater than 2R. Now the collar can be installed over a shaft (having radius R) while threads of the screw variously engage the threads of the receivers of the first and second end portions.

Once the collar is appropriately positioned over the shaft, the screw is further threaded into and within threaded receiver of the second end portion until the threaded portion of screw has entirely traversed and exited the receiver of the first end portion, so that the first end portion is free to move with respect to the screw. The collar then moves toward its rest position until it rests against the shaft (with G equal to $G_1$). As the screw continues to be advanced into the bore, and into the receiver of the second end portion, the screw head comes into abutment with a screw head abutment surface on the outside of first end portion. As the screw is further advanced, first end portion is forced toward the second end portion, clamping the collar to the shaft.

BRIEF DESCRIPTION OF THE DRAWINGS

These and other advantages of the present invention will be more fully understood by reference to the following detailed description in conjunction with the detailed in which.

DETAILED DESCRIPTION OF THE PREFERRED EMBODIMENT

Figure 1A:
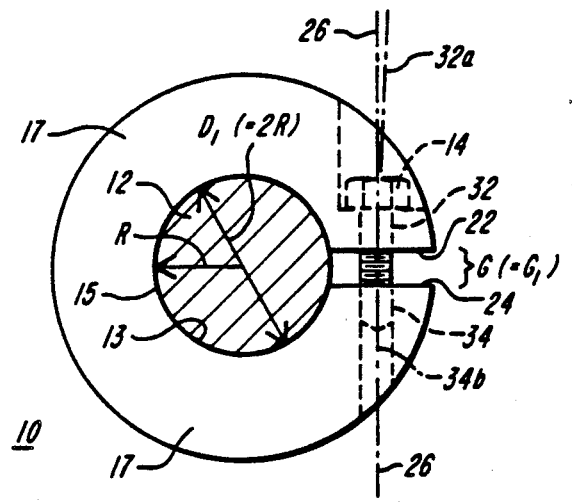
FIG. 1A is a side cross-section of the present clamp collar invention fitted to a shaft having a radius R.

As shown in FIG. 1A, the present invention provides a clamp collar 10, which in its illustrated deformed state clamps along its entire internal surface 13 to the outer surface 15 of rotatable shaft 12 (shown in FIG. 1A), the shaft having a radius R. Clamp 10 is generally C-shaped, having two opposed end portions 22 and 24 with a flexure portion between those end portions. In the illustrated embodiment, the flexure portion is distributed along the segment between the end portions 22 and 24 of the C-shaped clamp 10, and is indicated generally by reference designation 17.

Clamp 10 is provided with a coupling arrangement having a threaded screw receiver 32 (i.e., a threaded bore) extending along an axis $32a$ in first end portion 22 and having a second threaded screw receiver 34 (i.e., a threaded bore) extending along an axis $34a$ in second end portion 24. Receivers 32, 34 are coupled together by means of threaded engagement with a threaded screw 14. The threads of receivers 32, 34 and screw 14 have a common pitch P. The opposed end portions 22, 24 define an annularly extending gap having a dimension G in the circumferential direction. The inner surface 13 of collar 10 is substantially circular (with diameter $D_1$) in its clamped condition around shaft 12, in which condition $D_1$ equals 2R and gap G has a dimension $G_1$. When clamp 10 is clamped to the shaft 12 (as shown in FIG. 1A), the screw 14 is substantially coaxial (along axis 26) with the central axes $34a$ of receiver 34 and the ax is $32a$ of receiver 32.

Figure 1C:
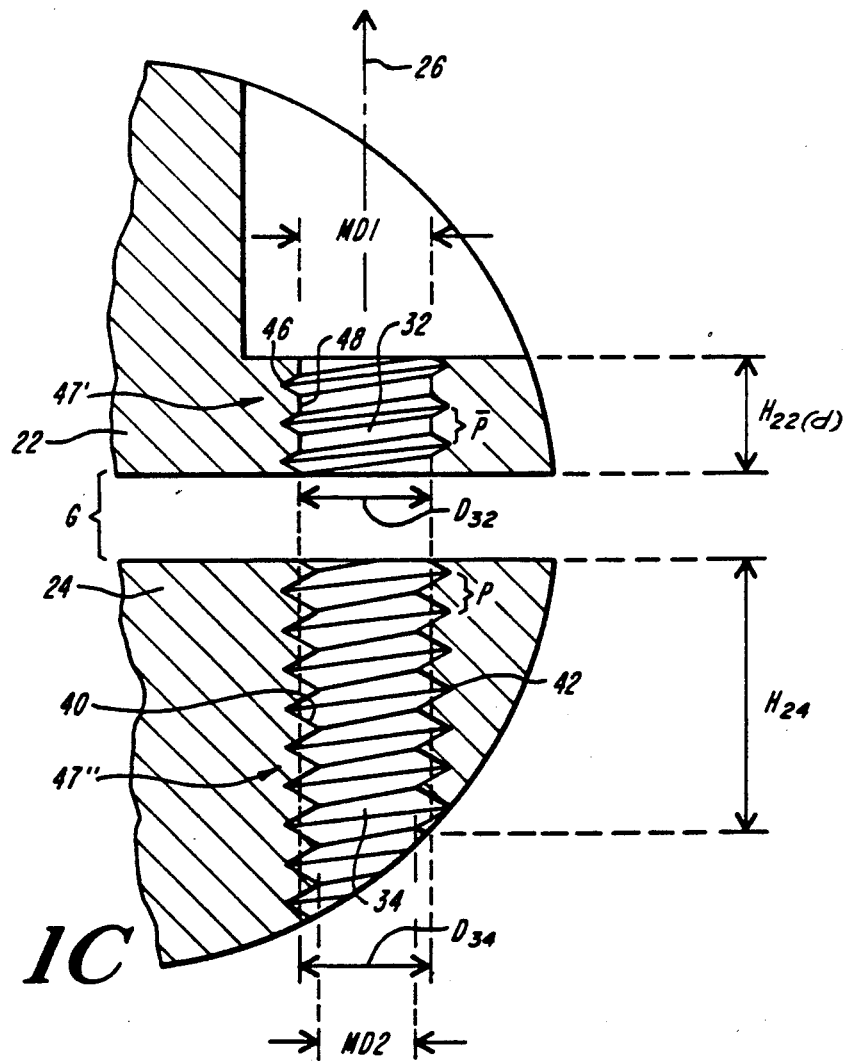
FIG. 1C is a side cross-sectional view of an alternative form of the invention, showing the threaded receivers.
Figure 1B:
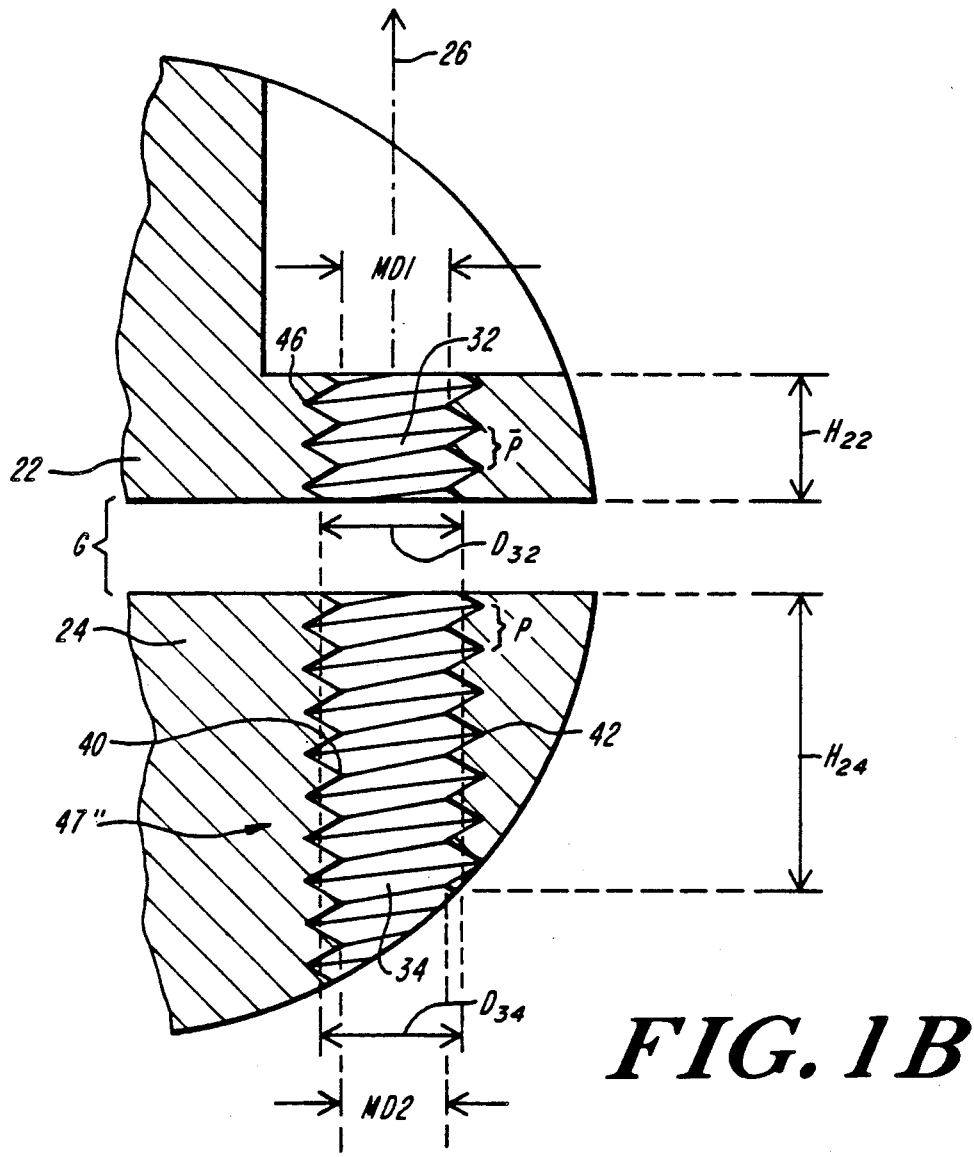
FIG. 1B is a side cross-sectional view of a portion of the clamp collar showing the threaded receivers of the embodiment of FIG. 1A.
Figure 4:
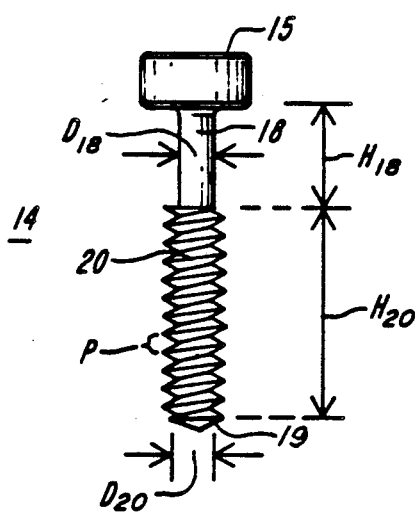
FIG. 4 is a side cross-sectional view of a screw for use with the present invention.

As seen in FIG. 1B, in a preferred embodiment, threaded receivers 32 and 34 are both provided with full threaded bores, each with the same pitch diameter ($D_{32}=D_{34}$). The bore of receiver 32 has a height equal to $H_{22}(=d)$. The screw for use with this form of the invention is shown in FIG. 4, wherein the shank 18 of that screw has a diameter slightly less than the minor diameter (MD1) of the bore 32 and the threaded portion 20 is adapted to interfit with bores 32, 34.

FIG. 1C shows an alternate form of the invention wherein threaded receiver 32 is provided with half threads $47'$ which rise to a peak 46 and are truncated at a base 48. The bases 48 are at the pitch diameter of receiver 32 where $D_{32}$ is slightly greater than the pitch diameter of the threaded portion of a screw, so that the screw is adapted to interfit with the bores 32, 34. Receiver 32 has a height $H_{22}(=d)$. End portion 24 includes threaded receiver 34 having full threads $47''$ which alternate between inner and outer peaks 40, 42, thus defining an average internal diameter (or pitch diameter PD) $D_{34}$ which is slightly larger than the pitch diameter of the threaded portion of the screw. The screw best adapted for the embodiment of FIG. 1C is similar to that shown in FIG. 4 but where the shank diameter may be as large as the pitch diameter of that screw.

Figure 2:
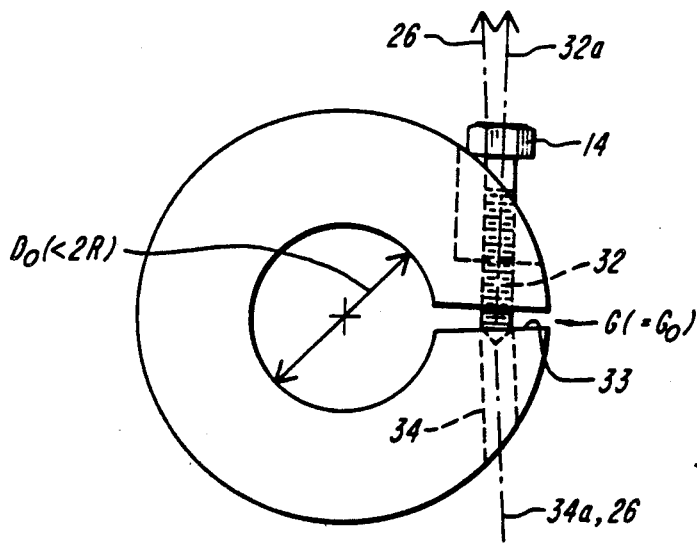
FIG. 2 is a side cross-section of the present clamp collar invention in its at rest state before installation on a rotatable shaft.

Turning to FIG. 2, collar 10 is shown in its "at rest," undeformed state, the ends of end portions 22, 24 are separated to form a gap dimension $G_0$, where $G_0$ is less than $G_1$. When the collar 10 is in this rest (non-expanded) state, the axes $32a$ and $34a$ of receivers 32, 34 are slightly canted with respect to each other, as indicated schematically (but in an exaggerated manner). In this condition, while the internal surface 13 of clamp collar 10 is slightly out of round, still it is nearly circular and may be understood to have a "nominal internal diameter" $D_0$, where $D_0$ is less than 2R. Hence, it will be appreciated that in order to mount or install clamp collar 10 on a shaft 12 having radius R, it is necessary to apply forces to circumferentially expand the clamp, preferably to a condition where the clamp has a nominal internal diameter at least slightly greater than 2R, so that it may readily slide onto shaft 12.

Figure 3:
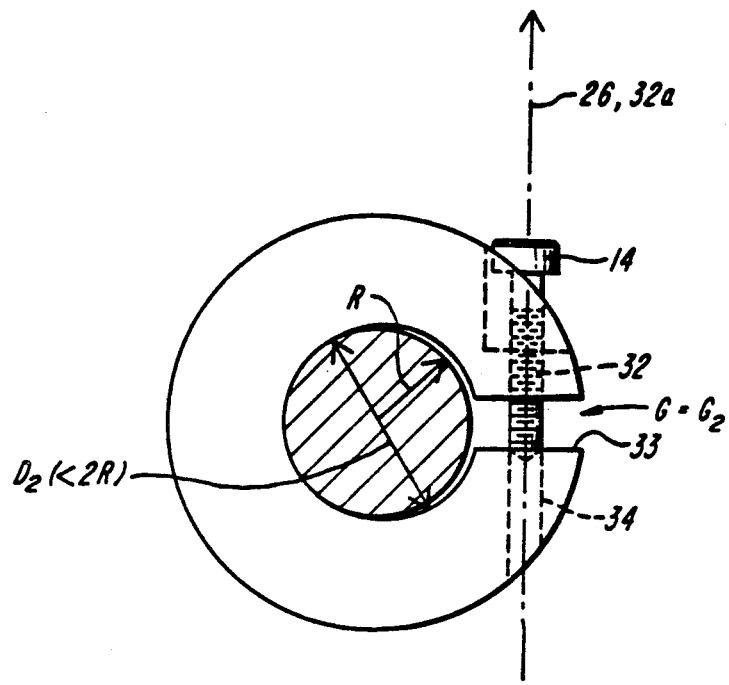
FIG. 3 is a side cross-section of the clamp collar of FIGS. 1A and 2 with the clamp collar expanded to be slidable over a rotatable shaft having a radius R.

This is shown in FIG. 3, where the "nominal internal diameter" $D_2$ is greater than 2R, and end portions 22, 24 define a gap dimension $G_2$, where $G_2$ is greater than $G_1$. As described below in conjunction with FIG. 5C, the thread patterns of receivers 32 and 34 establish a common helical thread pattern when the gap equals $G_2$. After this expansion, and placement over the shaft, the forces that expanded the collar may be released, so that the collar 10 moves toward its rest state but stops when the surface 13 engages the outer surface 15 of shaft 12.

Figure 5A:
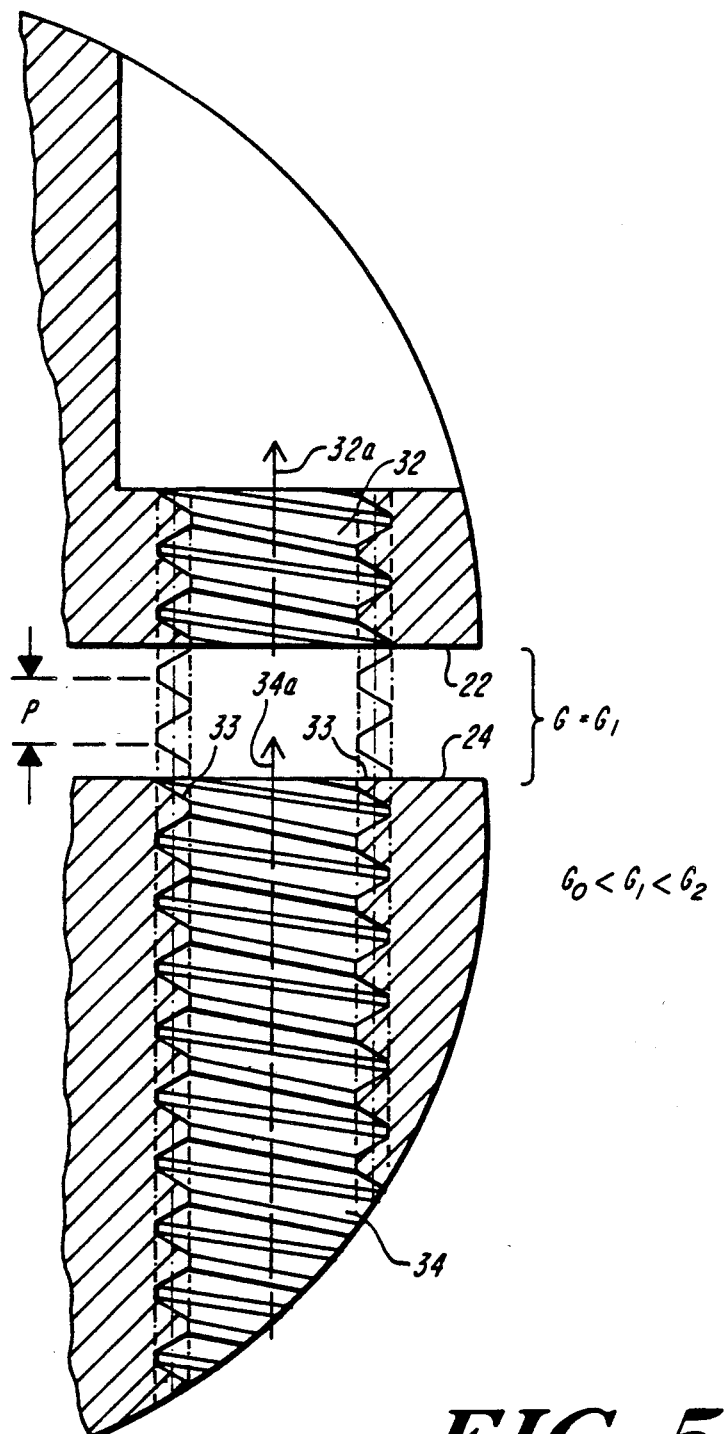
FIG. 5A, 5B and 5C schematically show the relative axial positions of the threaded receivers of the embodiment of FIGS. 1A, 2 and 3, respectively.
Figure 5B:
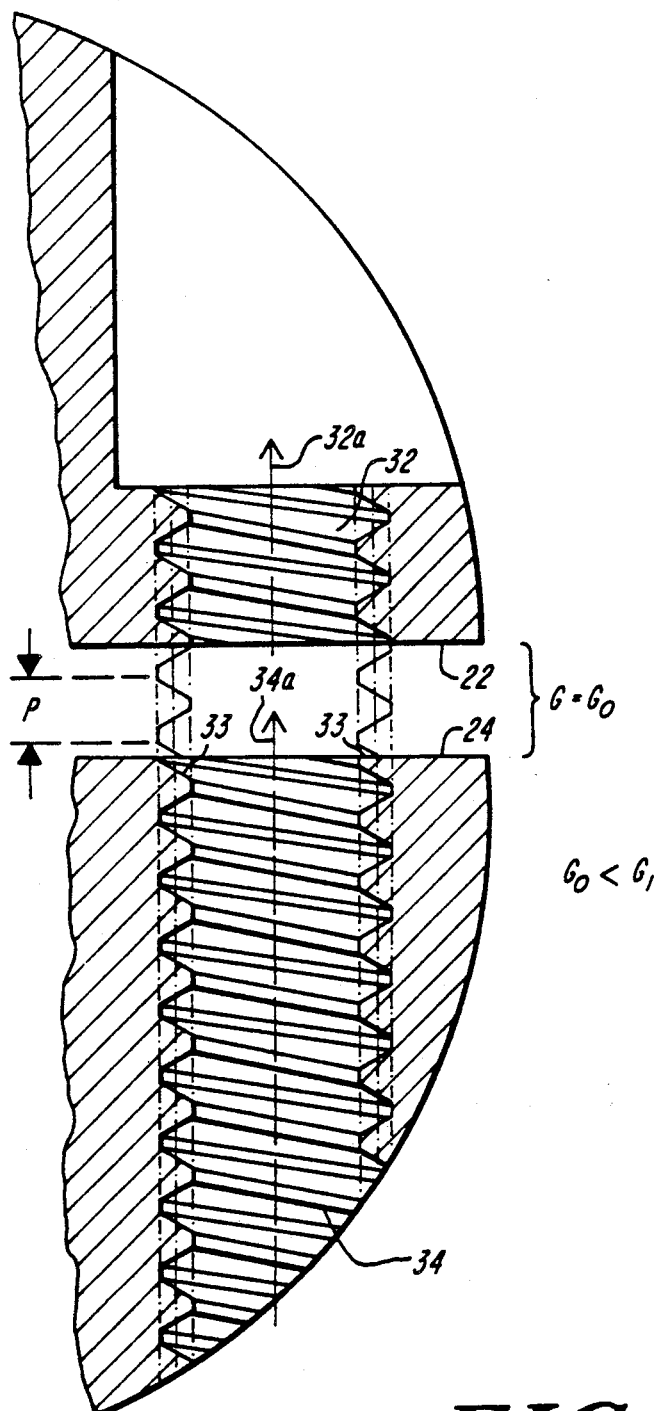
Figure 5C:
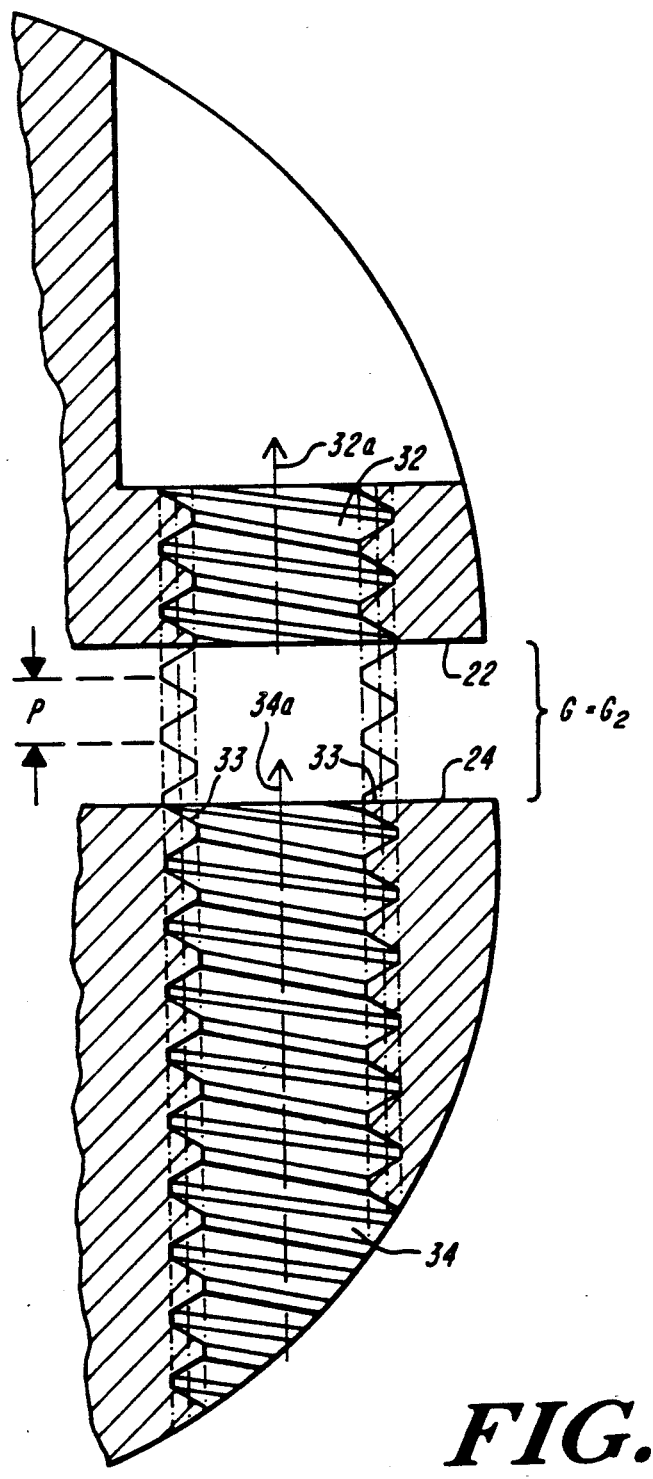

In the preferred form of the invention, the full range of relative motion of the ends 22 and 24 is less than one pitch length (P). Accordingly, it will be understood that the angular offsets of axis $32a$ from axis 26 (and from axis $34b$) is shown in exaggerated form in FIGS. 1-3. In effect, since the relative motion of ends 22 and 24 is so small, that motion may be viewed as axial (rather than circumferentially directed) motion. FIGS. 5A, 5B and 5C show (for the "full thread" embodiment of FIG. 1B) the relative axial positions of the receivers 32 and 34 for gaps equal to $G_1$, $G_0$ and $G_2$, respectively.

As shown in FIG. 5C, the thread patterns of receiver 32 and receiver 34 are axially aligned to establish a common helical thread pattern (with pitch P), and thus are defined as "in-phase". In this configuration, the screw 14 of FIG. 4 may be freely advanced from the receiver to the receiver 34 since the thread patterns are "in-phase".

As shown in FIGS. 5A and 5B, the thread pattern of receiver 32 is out of axial alignment with the thread pattern of receiver 34, and although both patterns have a common pitch P, they do not establish a common helical thread pattern, and thus are defined as "out-of-phase". In the configuration of FIG. 5B, as the screw 14 of FIG. 4 is initially advanced through receiver 32, the lead tip of screw 14 abuts the surface 33 of receiver 34, thereby applying an axial force along tending to separate the ends 22 and 24. In the configuration of FIG. 5A, once the screw 14 has been sufficiently threaded into receiver 34 (so that the unthreaded shank portion only lies within bore 32, then the cap or head 15 causes the gap to decrease as screw 14 is further threaded into receiver 34.

Thus, in order to establish the expansion shown in FIG. 3, the screw 14 is introduced and threaded into the receiver 32. Since the thread patterns of receivers 32 and 34 are "out-of-phase" with the collar 32 in its rest state (FIG. 1A), the forward tip of screw 14 applies a force to end 24 as the screw 14 is advanced into receiver 32. In response to this force, the collar 10 flexes (about flexure 17) to open the gap G until the gap becomes slightly larger (=$G_2$) than $G_1$ and the thread patterns of receivers 32 and 34 come substantially into axial alignment along axis 26. Then, as screw 14 is advanced, the forward tip of screw 14 is introduced into fully threaded receiver 34.

In order to accomplish this operation, in the preferred embodiment, $D_{32}$ equals $D_{34}$. As shown in FIG. 4, the screw 14 is a cap screw including a head 15, unthreaded shank 18 having a height $H_{18}$ and a diameter $D_{18}$ slightly less than the minor diameter of bore 32, and a threaded portion 20 having a height $H_{20}$ and a pitch diameter $D_{20}$ with threads of pitch P terminating at forward tip 19. The pitch, major, and minor diameters of screw 14 are adapted to permit a fit within the thread of bores 32 and 34. Preferably, $H_{18}$ just equals $H_{22}$, but may exceed that value, and $H_{20}$ exceeds $G_0$. Also, it is preferred that $D_{18}$ is slightly less than the minor diameter of bore 32, with both $D_{18}$ and $D_{20}$ being less than $D_{32}$ and $D_{34}$.

With this configuration, as the screw 14 initially enters receiver 34 following expansion of the gap G to $G_2$, the screw 14 then engages the receiver 32 and the fully threaded receiver 34, with gap G remaining at $G_2$. As soon as the threaded portion of screw 14 advances beyond receiver 32, however, the end portion 22 is free to move relative to end portion 24, and the collar moves toward its unexpanded state until surface 13 lies against surface 15. Further advancement of screw 14 results in the tightening of collar 14 about shaft 12 until surface 13 is secured against surface 15 with the gap G equal to $G_1$.

Thus, with the present invention, the resilient collar itself applies a portion of the clamping force to the shaft 12 as it attempts to return to its rest (unexpanded) state. The forces exerted by the screw 14 merely supplement that clamping force, thereby permitting use of smaller screws and applied forces, compared to the prior art, where all of the clamping force as well as forces to deform the collar must be provided by the screw.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A clamp collar assembly comprising:
   A. a C-shaped collar made of a resilient material, said collar extending between a first end and an opposed second end, said first and second ends defining a circumferentially extending gap having a dimension G in the circumferential direction, said collar having an inner nominal radius R when said collar is deformed such that G has a predetermined value $G_1$, said collar including a bore extending through said first and second ends along a reference axis when said collar is deformed such that G is equal to $G_1$, and wherein G has a value $G_0$ when said collar is undeformed, where $G_0$ is less than $G_1$,
   wherein the portion of said bore in said first end is threaded with a first helical thread pattern having length equal to d and having a pitch P, said bore having a pitch diameter equal to PD and having minor diameter equal to MD1, and
   wherein the portion of said bore in said second end is threaded with a second helical thread pattern, said second pattern being substantially the same as said first pattern with said pitch P and having a pitch diameter substantially equal to PD and having a minor diameter equal to MD2, where MD2 is less than or equal to MD1, and, wherein said first thread pattern and said second thread pattern establish a common helical pattern with said first and second patterns substantially in phase when G has a value $G_2$, where $G_2$ is greater than $G_1$,
   B. a screw having a shaft with a head on a proximal end thereof, said shaft having a distal end opposite said proximal end, said shaft having at said distal end a helically threaded region characterized by said pitch P and a pitch diameter substantially adapted to interfit with said bores in said first and second ends, and having a major diameter greater than MD2, and having at said proximal end a shank segment having an outer diameter less than MD1, said segment extending along said shaft at least a distance d.

2. A clamp collar according to claim 1 wherein said collar is made of steel.

3. The clamp collar according to claim 1 wherein said second thread pattern is a full thread and said first thread pattern is less than a full thread.

4. The clamp collar according to claim 1 wherein said second end is threaded with a helical full-thread.

5. A clamp collar device for attachment to a shaft of radius R, the device comprising
   a split generally C-shaped collar, said collar having, when said collar is undeformed, a nominal inner diameter $D_0$ which is less than 2R, and having a larger diameter $D_1$ equal to 2R when said collar is deformed and its innermost surface is positioned against the outer surface of a shaft of radius 2R, said collar defining and extending between a first end and an opposed second end and having a first screw receiver having threads of pitch P defined in said first end with a minor diameter MD1 and a second screw receiver having threads of pitch P defined in said second end with a minor diameter MD2, wherein said threads of said receivers establish a common helical thread pattern with the threads of said first and second screw receivers being substantially in-phase when said diameter has a predetermined value greater than $D_1$, and where MD2 is less than or equal to MD1, and wherein the pitch P of said first screw receiver is equal to the pitch P of said second screw receiver, and
   means for sequentially deforming said collar from said diameter $D_0$ to a diameter greater than $D_1$ and then to diameter $D_1$, said means adapted to provide sequential threaded engagement of a threaded screw having a thread pitch P first with said first screw receiver, then with both of said receivers and then only with said second receiver pursuant to advancement of said screw in one selected direction.

* * * * *